US008493543B2

(12) United States Patent
Ota

(10) Patent No.: US 8,493,543 B2
(45) Date of Patent: Jul. 23, 2013

(54) LIQUID CRYSTAL DISPLAY DEVICE

(75) Inventor: Akio Ota, Tottori (JP)

(73) Assignee: Sony Corporation, Tokyo (JP)

( * ) Notice: Subject to any disclaimer, the term of this patent is extended or adjusted under 35 U.S.C. 154(b) by 610 days.

(21) Appl. No.: 12/547,738

(22) Filed: Aug. 26, 2009

(65) Prior Publication Data

US 2010/0097538 A1    Apr. 22, 2010

(30) Foreign Application Priority Data

Oct. 17, 2008   (JP) .................................. 2008-268301
Oct. 20, 2008   (JP) .................................. 2008-269671

(51) Int. Cl.
G02F 1/1333    (2006.01)
G02F 1/136     (2006.01)
G02F 1/13      (2006.01)

(52) U.S. Cl.
USPC ................... 349/192; 349/40; 349/48; 349/54

(58) Field of Classification Search
USPC ........................ 349/48, 40, 54, 192
See application file for complete search history.

(56) References Cited

U.S. PATENT DOCUMENTS

2006/0221288 A1* 10/2006 Ota et al. ...................... 349/143
2008/0252807 A1* 10/2008 Huang et al. .................. 349/54

FOREIGN PATENT DOCUMENTS

| JP | 07-333654 | 12/1995 |
| JP | 09-097909 | 4/1997 |
| JP | 10-062808 | 3/1998 |
| JP | 10-213816 | 8/1998 |
| JP | 2000-323664 | 11/2000 |
| JP | 2000-338514 | 12/2000 |
| JP | 2006-276590 | 10/2006 |
| JP | 2007-188076 | 7/2007 |
| JP | 2008-003290 | 1/2008 |

OTHER PUBLICATIONS

Notice of reasons for refusal issued in connection with Japanese Patent Application No. 2008-268301, dated Jan. 8, 2013. (4 pages).
Notice of reasons for refusal issued in connection with Japanese Patent Application No. 2008-269671, dated Jan. 8, 2013. (3 pages).

* cited by examiner

Primary Examiner — Edward Glick
Assistant Examiner — Charles Chang
(74) Attorney, Agent, or Firm — K&L Gates LLP

(57) ABSTRACT

A liquid crystal display device includes: a first substrate; a second substrate which faces the first substrate; and a liquid crystal which is interposed between the first and second substrates. A plurality of scanning lines and signal lines arranged in a matrix shape, a plurality of switching elements arranged in the vicinities of intersections of the scanning lines and the signal lines in a display area, a plurality of pixel electrodes electrically connected to the switching elements, and a plurality of dummy pixels formed in a non-display area located in the periphery of the display area are formed on the first substrate close to a liquid crystal layer. Each of the plurality of dummy pixels is provided with a plurality of switching elements connected to the scanning line or the signal line, the plurality of switching elements are connected to each other in parallel, and one electrode of each of the switching elements is connected to a wiring to be supplied with a common potential.

4 Claims, 14 Drawing Sheets

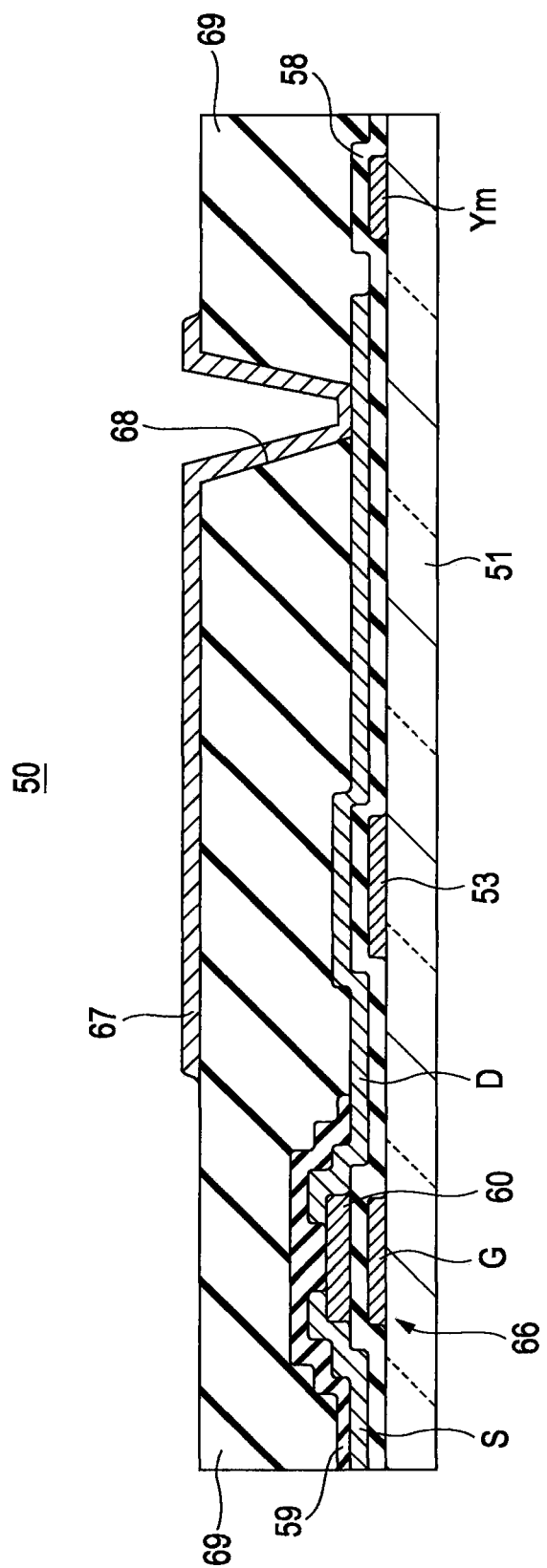

LIQUID CRYSTAL DISPLAY DEVICE

The entire disclosure of Japanese Patent Application No. 2008-268301, filed Oct. 17, 2008 and No. 2008-269671, filed Oct. 20, 2008 are expressly incorporated by reference herein.

BACKGROUND

1. Technical Field

The present invention relates to a liquid crystal display device and particularly to a liquid crystal display device in which a plurality of electrostatic protecting switching elements is formed in each of dummy pixels formed in the circumference of a display area.

2. Related Art

In general, a liquid crystal display device has features of thinness, lightweight and lower power consumption. In particular, an active matrix mode liquid crystal display device using thin film transistors (TFTs) as a switching element has been widely used in a mobile phone, a portable terminal, a large-scale TV, etc. However, in the liquid crystal display device, a display defect occurs in a step of finishing the liquid crystal display device, when static electricity invades a display area during a manufacturing process or during use time. In particular, it is easy for electrostatic defect to occur with high precision in a medium or small sized device. The static electricity may be also generated due to contact with another device, even when a panel is transported in the manufacturing process. Moreover, the static electricity is most frequently generated by rubbing, when an alignment film is rubbed. Accordingly, in a technique for manufacturing the liquid crystal display device, a request has been made to prevent a display defect from occurring due to the static electricity.

In order to prevent a display defect from occurring due to the static electricity, JP-A-2006-276590 discloses a liquid crystal display device in which dummy pixels are formed in the circumference of a display area and a plurality of electrostatic protecting minute dummy pixel electrodes and switching elements are formed within the dummy pixel. Here, the configuration of a dummy pixel area of the liquid crystal display device disclosed in JP-A-2006-276590 will be described with reference to FIGS. 12 to 14.

FIG. 12 is an enlarged plan view illustrating a dummy pixel area of an array substrate disclosed in JP-A-2006-276590. FIG. 13 is an enlarged plan view illustrating the region XIII of FIG. 12. FIG. 14 is a sectional view taken along the line XIV-XIV of FIG. 13.

A known liquid crystal display device 50 is a transflective liquid crystal display device in which a plurality of scanning lines and a plurality of signal lines are formed in a matrix shape on a first light-transmitting substrate 51 with a gate insulating film interposed therebetween. In FIG. 12, only scanning lines Xn−2, Xn−1, Xn, Xn+1, and Xn+2 and signal lines Y1, Y2, . . . , and Ym are illustrated. Areas surrounded by a plurality of scanning lines X1, X2, . . . , and Xn and the plurality of signal lines Y1, Y2, . . . , and Ym are display areas. Area surrounded by the plurality of scanning lines Xn, Xn+1, and Xn+2 and the plurality of signal lines Y1, Y2, . . . , and Ym are non-display areas.

In the display area, a pixel electrode 52 and a reflection plate 65 contributing to a display are formed in each of areas surrounded by the scanning lines and the signal lines. In TFTs 54, each of source electrodes S is connected to each of the signal lines Y1, Y2, . . . , and Ym, each of gate electrodes G is connected to each of the scanning lines X1, X2, . . . , and Xn, and each of drain electrodes D is electrically connected to each of the pixel electrodes 52 and each of the reflection plates 65 with a contact hole (not shown) interposed therebetween. An auxiliary capacitor electrode 53 is provided in the lower portion of the drain electrode D. Since an operational principle of the liquid crystal display device 50 having such a configuration is known, the detailed description is omitted.

On the other hand, the non-display areas surrounded by the plurality of scanning lines Xn, Xn+1, and Xn+2 and the plurality of signal lines Y1, Y2, . . . , and Ym are formed in the periphery of the display areas of the liquid crystal display device 50. In each of the non-display areas, a plurality of dummy pixels including a TFT 66 and a dummy pixel electrode 67 which does not contribute to a display are formed in each of the signal lines Y1, Y2, . . . , and Ym. In the TFTs 66 of the dummy pixels, each of source electrodes S is connected in parallel to each of the signal lines Y1, Y2, . . . , and Ym, each of gate electrodes G is connected in parallel to each of the scanning lines Xn+1 and Xn+2, and each of drain electrodes D is connected to each of the dummy pixel electrodes 67 formed on an inter-layer film 69 with a contact hole 68 interposed therebetween, as shown in FIG. 14. In addition, the TFT 66 of the dummy pixel is formed so as to be smaller than the channel width and the channel length of a TFT 64 connected to the pixel electrode 52 contributing to a display. Therefore, the TFT 66 is subjected to electrostatic breakdown earlier than the TFT 54 connected to the pixel electrode 52 contributing to a display.

The area of the dummy pixel electrode 67 is smaller than the sum of the areas of the reflection plate 65 and the pixel electrode 52 contributing to a display corresponding to one pixel in the display area. In FIGS. 12 and 13, the area of the dummy pixel electrode 67 is 1/10 of the sum of the areas of the reflection plate 65 and the pixel electrode 52 contributing to a display corresponding to one pixel in the display area. Ten dummy pixel electrodes are provided between the scanning lines Xn and Xn+1 and between the scanning lines Xn+1 and Xn+2, respectively. That is, a total of twenty dummy pixel electrodes are provided.

In the liquid crystal display device 50 having such a configuration, when static electricity invades from a signal line input terminal 62, a TFT $66_1$ located in a dummy pixel area and nearest to the signal line input terminal 62 is subjected to electrostatic breakdown and discharges the static electricity. Thereafter, when static electricity again invades from the signal line input terminal 62, a TFT $66_2$ next to the TFT $66_1$ located in the dummy pixel area and earlier subjected to the electrostatic breakdown is subjected to the electrostatic breakdown and discharges the static electricity. Accordingly, since the invasion of the static electricity resulting in the breakdown of the thin film transistor 54 located in the display area can be allowed up to twenty times during the manufacture of the liquid crystal display device 50, it is possible to obtain the transflective liquid crystal display device 50 which actually has no display defect.

However, the dummy pixels of the liquid crystal display device 50 disclosed in JP-A-2006-276590 are formed in the non-display areas (hereinafter, referred to as "a source dummy pixel area") on the upper and lower sides of the display areas in a plan view. Therefore, since the plurality of dummy pixels is formed within an area corresponding to one pixel in the source dummy pixel area, it is possible to cope with the plural invasions of the static electricity from the signal line. However, in the non-display areas (hereinafter, referred to as "a gate dummy pixel area") on the right and left sides of the display area in a plan view, it is difficult to form the plurality of dummy pixels in an area corresponding to one pixel. Therefore, in order to cope with the plural invasions of the static electricity from a side of the scanning lines, the plurality of dummy pixels have to be formed on both the right and left sides of the display areas in a plan view toward the outside. For this reason, it is difficult to narrow the width of the gate dummy pixel area. Moreover, since the dummy pixels of the liquid crystal display device 50 disclosed in JP-A-2006-276590 each include the TFT 66 and the dummy pixel electrode 67, the configuration is complicated.

SUMMARY

An advantage of some aspects of the invention is that it provides a liquid crystal display device including a plurality of electrostatic protection elements having a simple configuration within an area corresponding to one pixel even in all non-display areas and being capable of coping with plural invasions of static electricity without increasing the width of the non-display areas.

According to an aspect of the invention, there is provided a liquid crystal display device including: a first substrate; a second substrate which faces the first substrate; and a liquid crystal which is interposed between the first and second substrates. A plurality of scanning lines and signal lines arranged in a matrix shape, a plurality of switching elements arranged in the vicinities of intersections of the scanning lines and the signal lines in a display area, a plurality of pixel electrodes electrically connected to the switching elements, and a plurality of dummy pixels formed in a non-display area located in the periphery of the display area are formed on the first substrate on the side of a liquid crystal layer. Each of the plurality of dummy pixels is provided with a plurality of switching elements connected to the scanning line or the signal line, the plurality of switching elements are connected to each other in parallel, and one electrode of each of the switching elements is connected to a wiring of a common potential.

In the liquid crystal display device according to this aspect of the invention, the plurality of dummy pixels is formed in the non-display area in the periphery of the display area. That is, in the liquid crystal display device according to this aspect of the invention, the dummy pixel areas are formed in source dummy pixel areas as the non-display areas located in both of the ends of the display area in a row direction in a plan view and in gate dummy pixel areas as the non-display areas located in both of the ends of the display area in a column direction in a plan view. The plurality of dummy pixels is formed in each of the dummy pixel areas. The plurality of switching elements is formed in each of the dummy pixels. The plurality of switching elements is connected to each other in parallel. One electrode of each of the switching elements is connected to the wiring to be supplied with the common potential. Moreover, even when the dummy pixel electrodes are formed in the dummy pixel area, the dummy pixel electrodes may be connected to the electrodes of the switching elements through the contact holes, respectively, and the dummy pixel electrodes may be connected to the wiring to be supplied with the common potential.

Moreover, since the plurality of switching elements are connected to the scanning line or the signal line, the switching elements are arranged along the scanning line or the signal line. One electrode of each of the plurality of switching elements is connected to the wiring to be supplied with the common potential. Therefore, when static electricity enters the scanning line or the signal line, the switching elements close to the scanning line or the signal line which the static electricity enters are sequentially subjected to electrostatic breakdown. Moreover, since the static electricity discharges to the wiring to be supplied with the common potential, it is possible to effectively protect the display area of the liquid crystal display device. Furthermore, the entry of the static electricity is permitted until all the plurality of switching elements is subjected to electrostatic breakdown. Therefore, it is possible to obtain the liquid crystal display device actually having no display defect by increasing the number of switching elements.

The aspect of the invention is applicable not only to the liquid crystal display device of a vertical electric field mode such as a TN (Twisted Nematic) mode, a VA (Vertical Alignment) mode, and an ECB (Electrically Controlled Birefringence) mode, but also to the liquid crystal display device of a horizontal electric field such as an IPS (In-Plane Switching) mode and an FFS (Fringe Field Switching) mode. As the switching element usable in the aspect of the invention, a thin film transistor (TFT), a thin film diode, or a metal insulator metal (MIM) element can be used.

In the liquid crystal display device according to the aspect of the invention, the plurality of switching elements formed in each of the dummy pixels may be formed along the scanning line, and a wiring extending in a straight line shape from the signal line may be connected to the switching elements.

In the liquid crystal display device according to the aspect of the invention, the plurality of switching elements can be easily formed in one dummy pixel. Therefore, according to the liquid crystal display device according to the aspect of the invention, the plurality of switching elements can be formed along the scanning line, even when the width of the gate dummy pixel area is not broad. Accordingly, even though the width of the gate dummy pixel area is narrow, it is possible to effectively protect the display area of the liquid crystal display device.

In the liquid crystal display device according to the aspect of the invention, the plurality of switching elements formed in each of the dummy pixels may be formed along the signal line, and a wiring extending in a straight line shape from the scanning line may be connected to the switching elements.

In the liquid crystal display device according to the aspect of the invention, the plurality of switching elements can be formed along the signal line, even though the width of the source dummy pixel area is not broad. Accordingly, even though the width of the source dummy pixel area is narrow, it is possible to effectively protect the display area of the liquid crystal display device.

In the liquid crystal display device according to the aspect of the invention, in the dummy pixel, a bent portion may be formed in the scanning line or the signal line, and the plurality of switching elements may be formed along the bent portion.

In the liquid crystal display device according to the aspect of the invention, since the bent portion is formed in the scanning line or the signal line, the scanning line or the signal line in the dummy pixels is lengthened. With such a configuration, when the area occupied by the switching elements is compared to the area of one pixel, the area occupied by the switching element is small. Accordingly, it is possible to form many switching elements in the dummy pixel.

In the liquid crystal display device according to the aspect of the invention, in the dummy pixel, the bent portion may be formed in the scanning line and a diverged signal line extending along the outer periphery of the bent portion of the scanning line may be formed in the signal line.

In the liquid crystal display device, since the scanning line in the dummy pixels can be lengthened, the plurality of switching elements can be easily formed in the dummy pixels regardless of the width of the dummy pixel in the row direction. According to the liquid crystal display device having such a configuration, the plurality of switching elements can be formed along the scanning line particularly without broadening the width of the non-display areas on the right and left sides of the display area in a plan view. Therefore, it is possible to effectively protect the display area of the liquid crystal display device, even though the width of the non-display areas on the right and left sides of the display area is narrow in a plan view. As for the bent shape of the scanning line, since the pixels of the display area typically have a rectangular shape which is the shorter side of the scanning line, it is preferable that the scanning line is bent in a convex shape or a concave shape in the dummy pixels of the non-display areas on the right and left sides of the display area in a plan view. When the pixels of the display area have the horizontally long rectangular shape, it is preferable that the scanning line is bent in a "U" shape in a zigzag manner in the dummy pixels of the non-display areas on the right and left sides of the display area in a plan view. In either case, when the scanning line is bent, the diverged signal line extending along the outer periphery of the bent portion of the scanning line may be formed in the signal line.

In the liquid crystal display device according to the aspect of the invention, in the dummy pixel, the bent portion may be formed in the signal line and a diverged scanning line extending to intersect the bent portion of the signal line may be formed in the scanning line.

In the liquid crystal display device, since the signal line in the dummy pixels can be lengthened, the plurality of switching elements can be easily formed along the signal line even without narrowing the distance between the scanning lines in the non-display areas on the upper and lower sides of the display area in a plan view like the known examples. According to the liquid crystal display device having such a configuration, since many switching elements can be formed without broadening the width of the non-display areas on the upper and lower sides of the display area in a plan view, it is possible to effectively protect the display area of the liquid crystal display device. As for the bent shape of the signal line, since the pixels of the display area typically have a rectangular shape which is the longer side of the signal line, it is preferable that the signal line is bent in a "U" shape in a zigzag manner in the dummy pixels of the non-display areas on the upper and lower sides of the display area in a plan view. When the pixels of the display area have the horizontally long rectangular shape, it is preferable that the signal line is bent in a concave shape or a convex shape in the dummy pixels of the non-display areas on the upper and lower sides of the display area in a plan view. In either case, the scanning line may extend in a branch shape so as to intersect the bent portion of the signal line.

In the liquid crystal display device according to the aspect of the invention, the switching elements formed in the dummy pixel may have substantially the same size as that of the switching elements formed in the pixel area.

When the switching elements formed in the dummy pixel have substantially the same size as that of the switching elements formed in the pixel area, it is not necessary to use a mask for forming the switching elements in the dummy pixel area in particular and it is possible to simultaneously form the switching elements of the liquid crystal display device. Therefore, in the liquid crystal display device according to the aspect of the invention, it is possible to simply manufacture the plurality of switching elements in the dummy pixel area. In addition, "substantially the same size" in the aspect of the invention is used to mean that the switching elements may not necessarily have the same size but it is preferable that the switching elements have the same size.

In the liquid crystal display device according to the aspect of the invention, the switching element may be a TFT and in the TFT formed in the dummy pixel, a source electrode of the thin film transistor may be connected to the signal line, a gate electrode thereof may be connected to the scanning line, and a drain electrode thereof may be connected to the wiring of a common potential.

The TFT is generally used as the switching element of the liquid crystal display device. Therefore, in the liquid crystal display device according to the aspect of the invention, the switching elements in the display area and the switching elements in the dummy pixels are formed by the TFT. Accordingly, it is possible to simultaneously manufacture the switching elements with ease.

In the liquid crystal display device according to the aspect of the invention, a channel width and a channel length of each TFT formed in the dummy pixel may be smaller than a channel width and a channel length of each TFT formed in the display area.

When the channel width and the channel length of each TFT formed in the dummy pixel are smaller than the channel width and the channel length of each TFT formed in the display area, the TFTs formed in the dummy pixel are more easily subjected to electrostatic breakdown. Therefore, according to the liquid crystal display device according to the aspect of the invention, the TFTs formed in the dummy pixels are earlier subjected to electrostatic breakdown, even when static electricity invades from the outside. Accordingly, since it is difficult for the static electricity to enter the display area, it is possible to effectively protect the display area of the liquid crystal display device.

According to another aspect of the invention, there is provided a liquid crystal display device including a first substrate, a second substrate, a liquid crystal layer, a display area, a first dummy pixel area, a second dummy pixel area, a first wiring, a second wiring, a third wiring, and dummy pixels.

The second substrate faces the first substrate. The liquid crystal layer is interposed between the first and second substrates. An image is displayed on the display area. The first dummy pixel area is provided outside the display area. The first dummy pixel area is adjacent to the display area in a first direction. The second dummy pixel area is provided outside the display area. The second dummy pixel area is adjacent to the display area in a second direction intersecting the first direction.

The first wiring is interposed between the first substrate and the liquid crystal layer. The first wiring extends from the first dummy pixel area to the display area in the first direction. The second wiring is interposed between the first substrate and the liquid crystal layer. The second wiring extends from the second dummy pixel area to the display area in the second direction. The third wiring is supplied with a common potential. The dummy pixels are provided in the first and second dummy pixel areas.

Each of the dummy pixels is provided with a plurality of switching elements. In each of the dummy pixels, the plurality of switching elements is connected to each other in parallel. In the first dummy pixel area, the plurality of switching elements in each of the dummy pixels is connected to the first wiring. In the second dummy pixel area, the plurality of switching elements in each of the dummy pixels is connected to the second wiring. One electrode of each of the switching elements is connected to the third wiring.

In the liquid crystal display device, when static electricity enters the first wiring in the first dummy pixel area, the static electricity is easily discharged from the first wiring to the third wiring through the switching elements. Accordingly, it is easy to prevent the static electricity entering the first wiring in the first dummy pixel area from entering the display area through the first wiring.

When static electricity enters the second wiring in the second dummy pixel area, the static electricity is easily discharged from the second wiring to the third wiring through the switching elements. Accordingly, it is easy to prevent the static electricity entering the second wiring in the second dummy pixel area from entering the display area through the second wiring.

As a consequence, in the liquid crystal display device, it is possible to easily prevent the static electricity from entering the display area through the first or second wiring. Moreover, it is possible to easily protect the display area against the static electricity.

BRIEF DESCRIPTION OF THE DRAWINGS

The invention will be described with reference to the accompanying drawings, wherein like numbers reference like elements.

FIG. 14 is a sectional view taken along the line XIV-XIV of FIG. 13.

DESCRIPTION OF EXEMPLARY EMBODIMENTS

Figure 1:
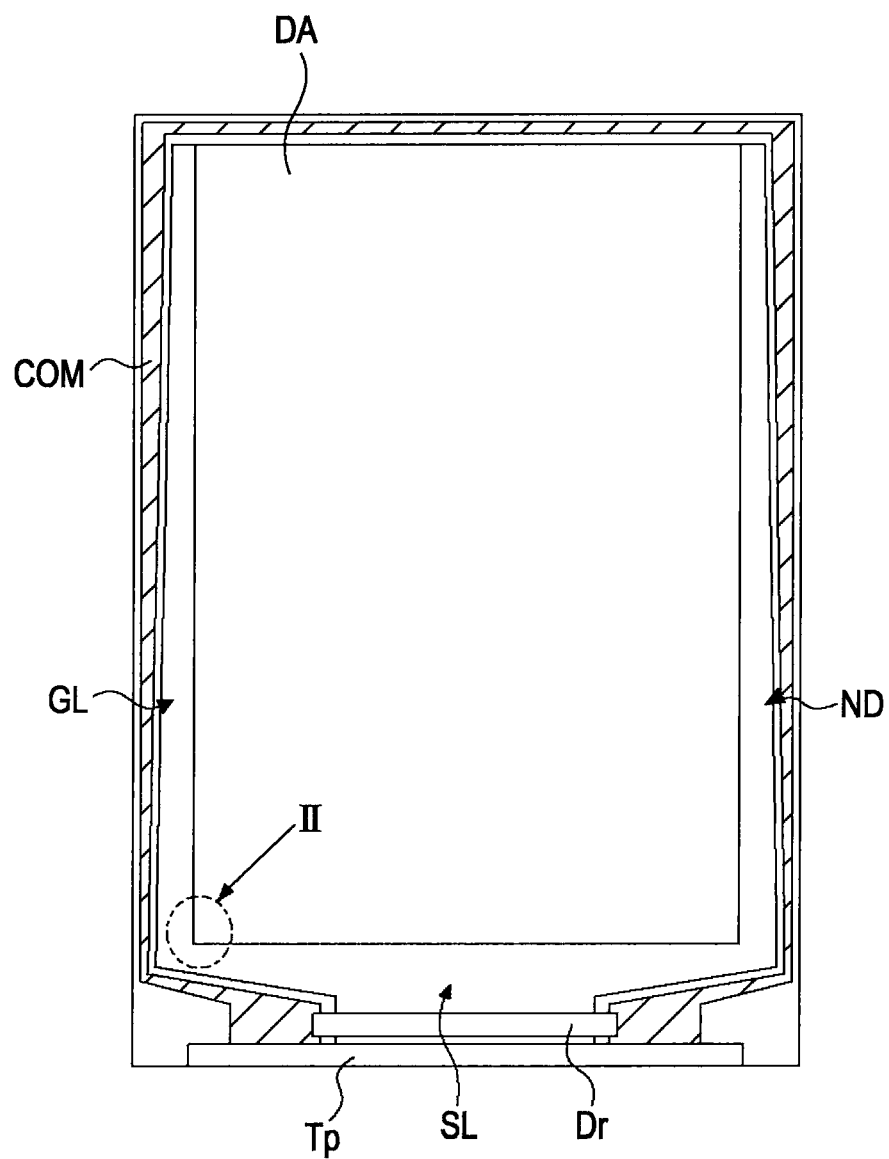
FIG. 1 is an enlarged plan view illustrating an array substrate of a liquid panel according to an embodiment.

Exemplary embodiments of the invention will be described more hereinafter with reference to the accompanying drawings. However, the invention should not be construed as limited to the exemplary embodiments and may be embodied in various modified forms without departing the technical spirit of the invention apparent from claims. In addition, in order to enable layers and elements to be easily recognized in the drawings used to make description in the specification, the layers and the elements are appropriately shown with different scales and are not necessarily shown in proportion to the actual sizes.

Figure 2:
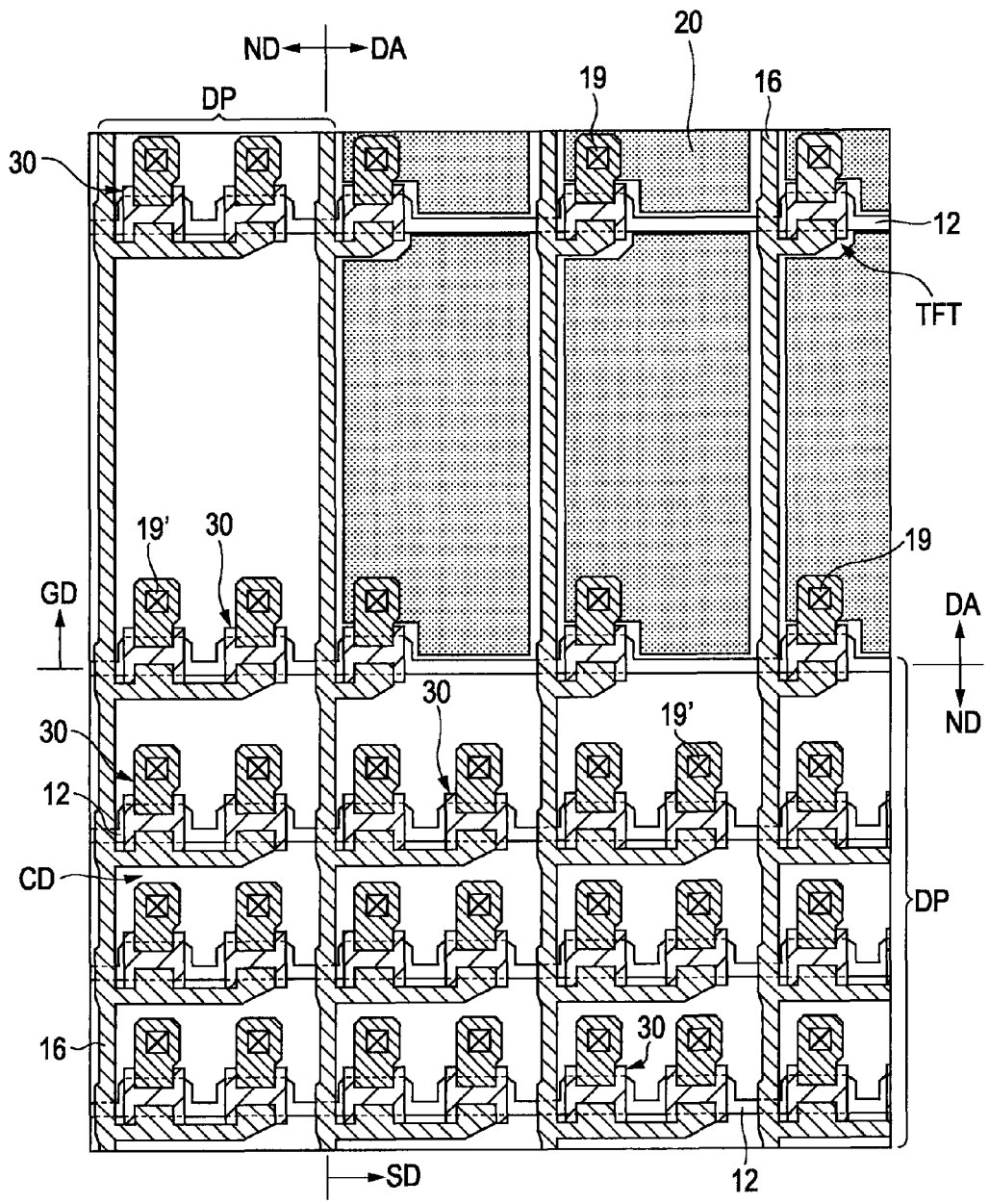
FIG. 2 is an enlarged plan view illustrating the region II of FIG. 1.
Figure 3:
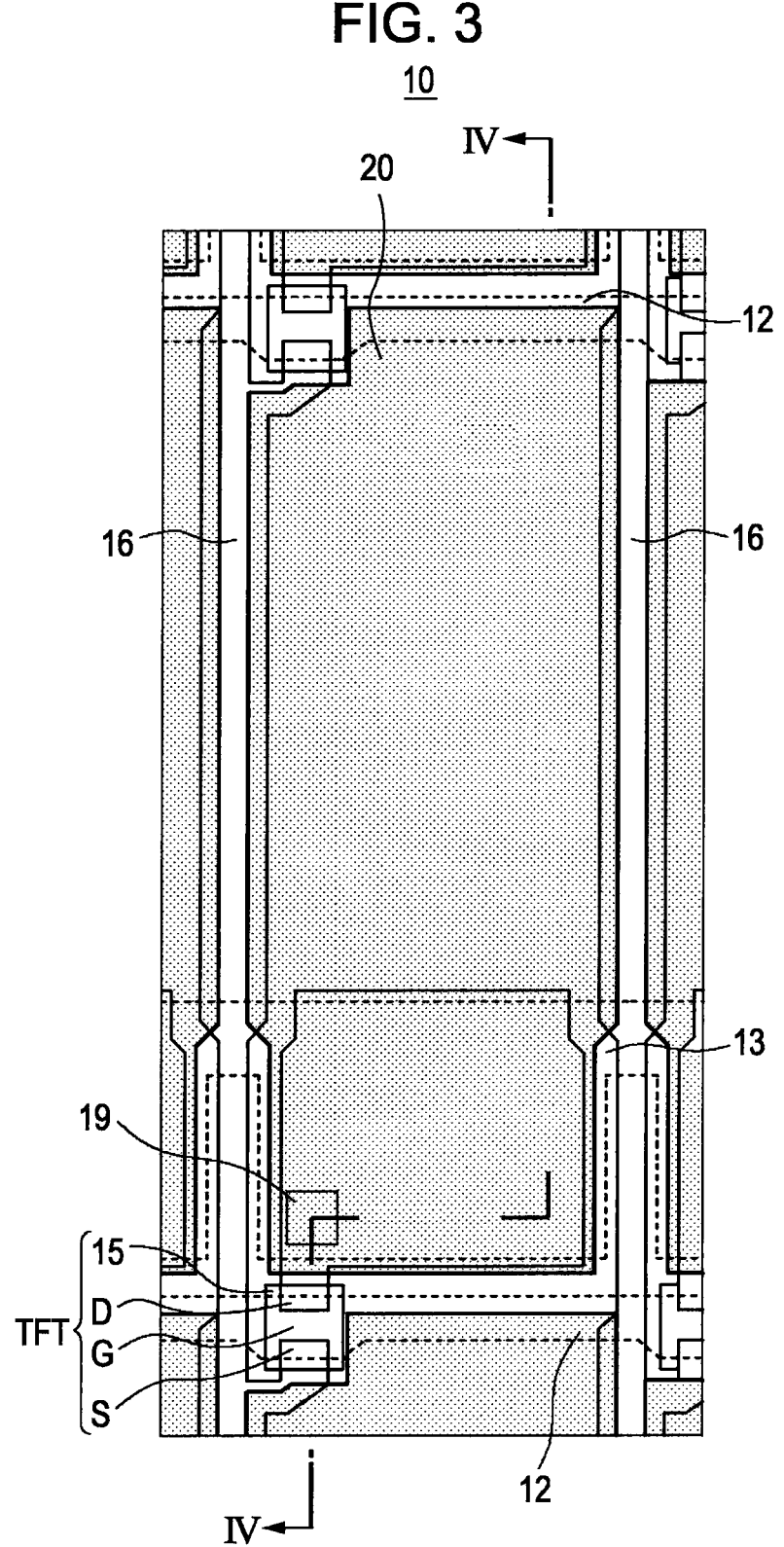
FIG. 3 is an enlarged plan view illustrating one sub-pixel of a display area of FIG. 2.
Figure 4:
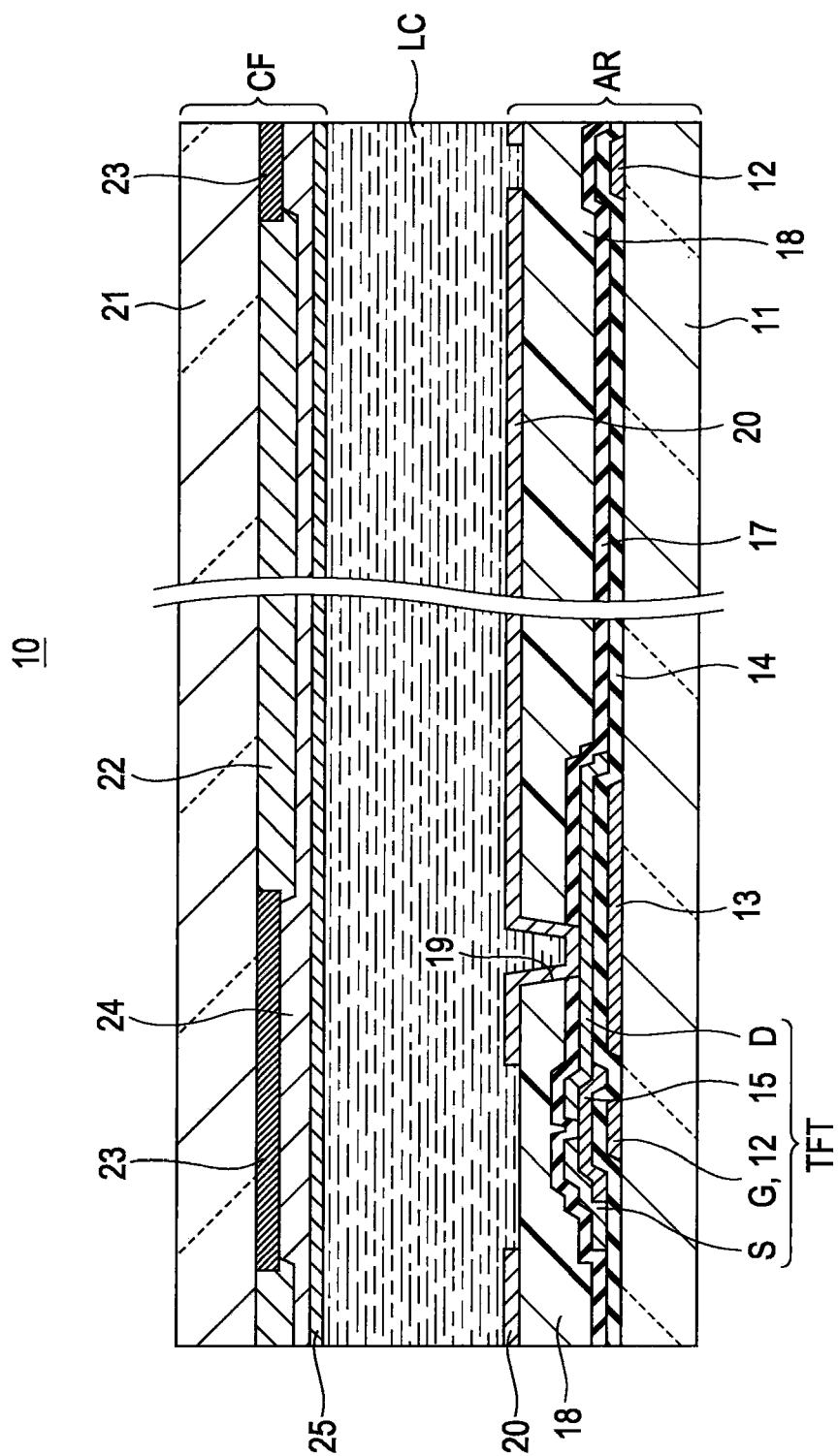
FIG. 4 is a sectional view taken along the line IV-IV of FIG. 3.
Figure 5:
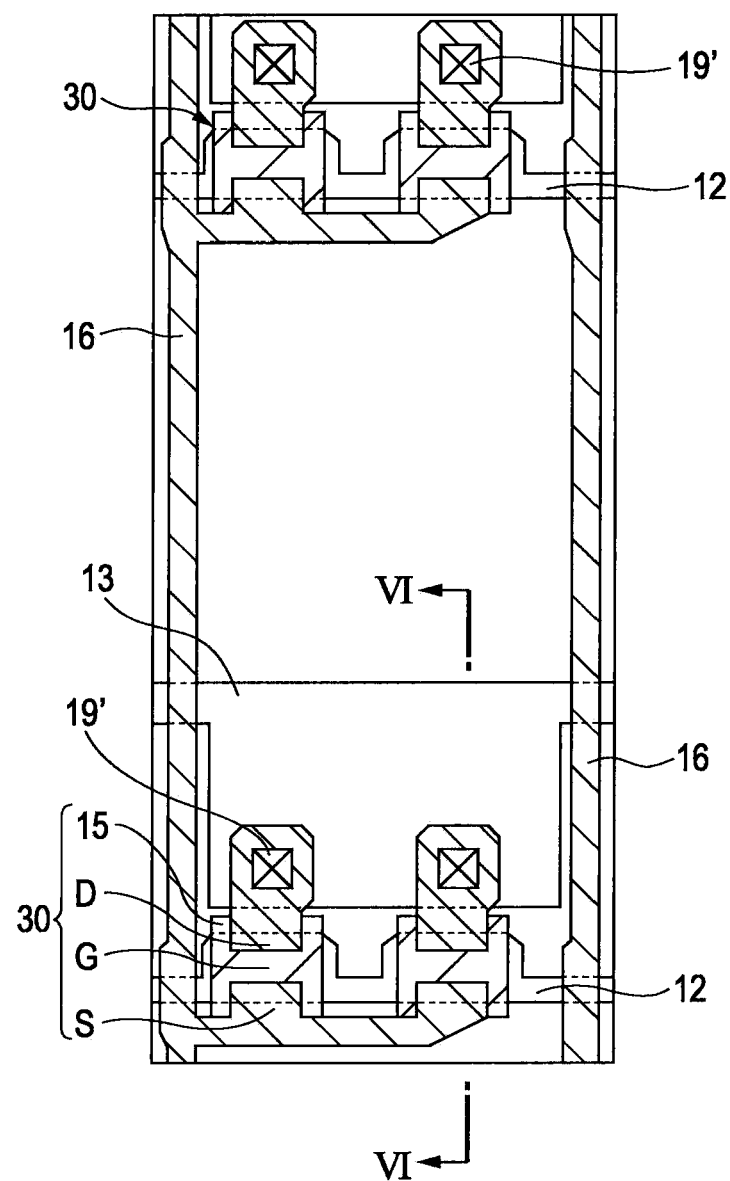
FIG. 5 is an enlarged plan view illustrating one dummy pixel of a gate dummy pixel area of FIG. 2.
Figure 6:
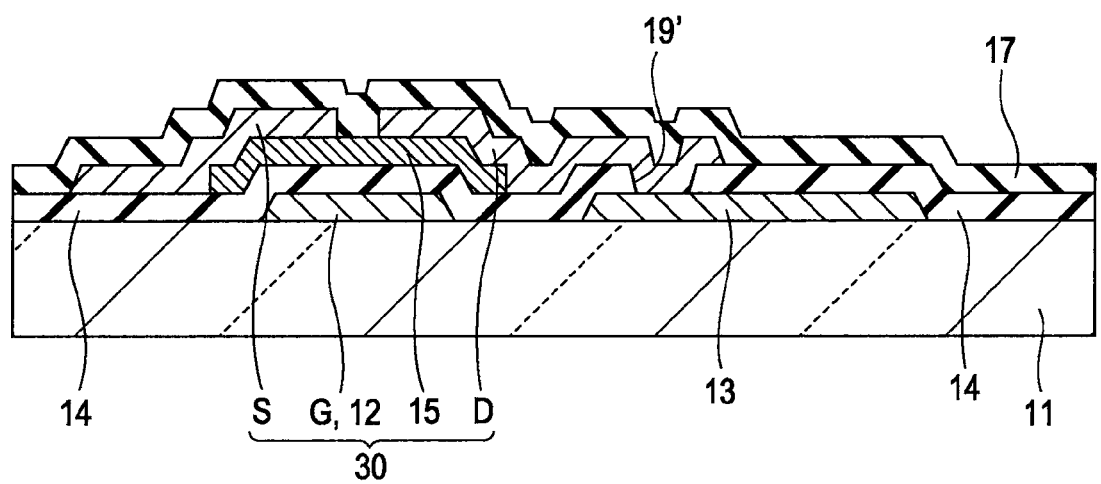
FIG. 6 is a sectional view taken along the line VI-VI of FIG. 5.
Figure 7:
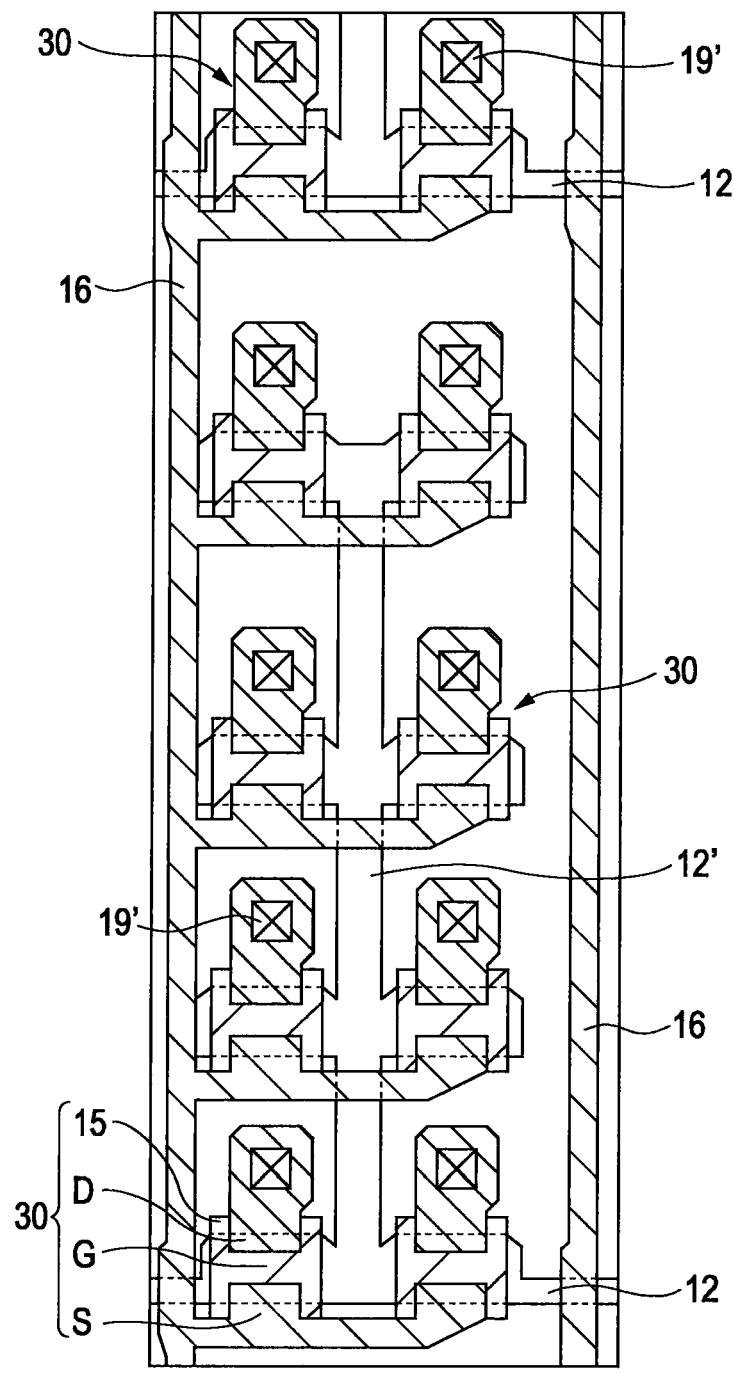
FIG. 7 is an enlarged plan view illustrating one dummy pixel of a gate dummy pixel area according to Modified Example 1.

FIG. 1 is an enlarged plan view illustrating an array substrate of a liquid panel according to an embodiment. FIG. 2 is an enlarged plan view illustrating the region II of FIG. 1. FIG. 3 is an enlarged plan view illustrating one sub-pixel of a display area of FIG. 2. FIG. 4 is a sectional view taken along the line IV-IV of FIG. 3. FIG. 5 is an enlarged plan view illustrating one dummy pixel of a gate dummy pixel area of FIG. 2. FIG. 6 is a sectional view taken along the line VI-VI of FIG. 5. FIG. 7 is an enlarged plan view illustrating one dummy pixel of a gate dummy pixel area according to Modified Example.

Embodiment

A liquid crystal panel 10 according to the embodiment will be described with reference to FIGS. 1 to 6. In the liquid crystal panel 10 according to the embodiment, a liquid crystal layer LC is interposed between an array substrate AR and a color filter substrate CF, as shown in FIG. 4. The thickness of the liquid crystal layer LC is uniformly maintained by columnar spacers (not shown). Polarizing plates (not shown) are each formed on the rear surface of the array substrate AR and the front surface of the color filter substrate CF. A backlight unit (not shown) emits light from a side of the rear surface of the array substrate AR.

As shown in FIG. 1, the array substrate AR includes a display area DA where various images are displayed and a non-display area ND formed in the periphery of the display area. The array substrate AR is provided with a first terminal section Dr for disposing a driver IC in one end of the non-display area ND and a second terminal section Tp for external connection. The non-display area ND is provided with scanning line drawn wirings GL for drawing the scanning lines of the display area DA to the first terminal section Dr and signal line drawn wirings SL for drawing signal lines to the first terminal section Dr. In addition, the non-display area ND is provided with common wirings COM for drawing auxiliary capacitor lines 13 (see FIGS. 3 to 5) to the first terminal section Dr. When an image is displayed on the display area DA, the auxiliary capacitor lines 13 are supplied with a common potential. That is, when an image is displayed on the display DA, the common wirings COM and the auxiliary capacitor lines 13 hold the common potential.

Dummy pixel areas DP including a source dummy pixel area SD, a gate dummy pixel area GD, and a common dummy pixel area CD are formed in the vicinity of the border of the display areas DA and the non-display area ND, as shown in FIG. 2. The source dummy pixel area SD is formed on the side of the signal line drawn wirings SL of the non-display area ND and provides an electrostatic protection mechanism for resisting static electricity coming from the signal line drawn wirings SL. The gate dummy pixel area GD is provided on the side of the scanning line drawn wirings GL of the non-display area ND and provides an electrostatic protection mechanism for resisting static electricity coming from the scanning line drawn wirings GL. The common dummy pixel areas CD is formed in each unit between the source dummy pixel area SD and the gate dummy pixel area GD and provides an electrostatic protection mechanism for static electricity coming from both the signal line drawn wiring SL and the scanning line drawn wiring GL. The detailed configuration of the dummy pixel area DP will be described below.

First, the configuration of the array substrate AR will be described in order of a manufacturing process. As shown in FIGS. 3 and 4, the array substrate AR includes a plurality of scanning lines 12 made of opaque metal such as aluminum metal, aluminum alloy, or molybdenum, and the auxiliary capacitor lines 13 (including a portion operating as an auxiliary capacitor electrode with a gradually widening width) formed in parallel between the scanning lines 12, and the common wirings COM (see FIG. 1) formed on the non-display areas ND on a side of liquid crystal LC of the first substrate 11 made of glass, quartz, plastic, or the like. The scanning lines 12 and the auxiliary capacitor lines 13 are formed not only in the display area DA but also in the dummy pixel areas DP. In addition, upon forming the scanning lines 12 and the like, a plurality of gate wirings extending toward the first terminal section Dr is formed in the scanning line drawn wirings GL of the non-display area ND and a plurality of gate wirings extending toward the first terminal section Dr is likewise formed in the signal line drawn wirings SL (all of which are not shown).

The scanning lines 12, the auxiliary capacitor lines 13, and the gate wirings, and the common wirings COM are formed by forming an opaque metal layer made of aluminum metal, aluminum alloy, molybdenum, or the like across the entire surface of the first substrate 11, applying resist by a spin coating method, performing exposure and development processes so as to form a predetermined pattern, and etching unnecessary parts. Subsequently, the scanning lines 12, the gate wirings, the auxiliary capacitor lines 13, and the exposed surface of the first substrate 11 are covered to form the gate insulating film 14 formed of an inorganic insulating film made of silicon oxide or silicon nitride.

Subsequently, a semiconductor layer 15 made of, for example, amorphous silicon is formed on the gate insulating film 14. The semiconductor layer 15 is formed by forming an amorphous silicon layer across the entire surface of the gate insulating film 14, applying resist by a spin coating method, performing exposure and development processes so as to form a predetermined pattern, and etching unnecessary parts. The semiconductor layer 15 is formed not only in the display area DA but also in the dummy pixel areas DP.

Subsequently, a first contact hole 19' (see FIGS. 5 and 6) is formed in each region facing the auxiliary capacitor lines 13 of the dummy pixel area DP. Subsequently, a source electrode S and a drain electrode D are formed so that parts thereof cover the semiconductor layer 15. In the liquid crystal display device 10 according to this embodiment, a portion of the semiconductor layer 15 which faces a portion of the scanning line 12 having a broader width with the gate insulating film 14 interposed therebetween and which overlaps with the scanning line 12 in a plan view serves as a gate electrode G of a TFT. The source electrode S is formed by a portion diverged from the signal line 16. The signal line 16 and the drain electrode D are made of opaque metal such as aluminum metal, aluminum alloy, and molybdenum, and the like. The signal lines and the drain electrodes are formed not only in the display area DA but also in the dummy pixel areas DP. With such a configuration, each of the drain electrodes D formed in the dummy pixel areas DP is electrically connected to the auxiliary capacitor line 13 through the contact hole 19'.

Upon forming the signal lines 16 and the drain electrodes D, a plurality of source wirings extending toward the first terminal section Dr are formed in the scanning line drawn wirings GL of the non-display area ND, and source wirings extending toward the first terminal section Dr are likewise formed in the signal line drawn wirings SL (all of which are not shown). In addition, the gate wirings and the source wirings according to the invention do not necessarily mean the wirings connected to the scanning lines 12 or the signal lines 16 of the liquid crystal panel. Wirings formed along with the scanning lines 12 are referred to as the gate wirings and wirings formed along with the signal lines 16 are referred to as the source wirings. In the liquid crystal display device 10 according to this embodiment, wirings below the gate insulating film 14 are the gate wirings and wirings above the gate insulating film 14 are the source wirings, and thus both the lines are not distinguished from each other in a plan view.

A passivation film 17 formed of an inorganic insulating film made of silicon oxide or silicon nitride is formed in all the display area DA and the non-display areas ND so as to cover the semiconductor layer 15, the source electrodes S, the drain electrodes D, the signal lines 16, the source wirings, and the exposed portion of the gate insulating film 14. Moreover, an inter-layer film 18 made of a resin material and covering the passivation film 17 is formed in the display area DA. The inter-layer film 18 can be formed by appropriately selecting and using a photosensitive resist material having a good transparent property and an excellent electrical insulating property. The inter-layer film 18 is formed by applying resist onto the surface of the passivation film 17 by a spin coating method, performing exposure and development processes so as to have a predetermined pattern, and etching unnecessary parts.

Subsequently, a contact hole 19 perforated through the passivation film 17 and the inter-layer film 18 to reach each drain electrode D is formed. Moreover, a pixel electrode 20 made of a transparent conductive material such as ITO or IZO is formed in each of pixel areas of the display area DA so as to cover the inter-layer 18. The pixel electrode 20 is electrically connected to the drain electrode D through the contact hole 19. An alignment film (not shown) is formed so as to cover the surface of the pixel electrode 20. In this way, it is possible to obtain the array substrate AR of the liquid crystal display device 10 according to this embodiment.

Next, the color filter substrate CF will be described. The color filter substrate CF includes a second substrate 21 made of glass, quartz, plastic, or the like. The second substrate 21 is provided with a color filter layer 22 through which different color light (R, G, B, or colorless light) passes in each sub-pixel and a light-shielding layer 23. A top coat layer 24 is formed so as to cover the color filter layer 22 and the light-shielding layer 23. A common electrode 25 made of ITO or IZO is formed so as to cover the top coat layer 24. An alignment film (not shown) is formed on the surface of the common electrode 25. In this way, the color filter substrate of the liquid crystal display device 10 according to this embodiment is finished.

Then, the liquid crystal display device 10 according to this embodiment can be obtained by facing the array substrate AR and the color filter substrate CF formed in the above-described manner one another, allowing a sealing member (not shown) to seal the circumferences of the array substrate and the color filter substrate, and allowing the liquid crystal LC to be sealed in a tightly-sealed area formed between the array substrate AR and the color filter substrate CF.

Next, the dummy pixel area DP formed in the periphery of the display area DA will be described. The dummy pixel area DP includes the source dummy pixel area SD, the gate dummy pixel area GD, and the common dummy pixel area CD. A distance between the scanning lines 12 in the source dummy pixel area SD is narrow, but a distance between the scanning lines 12 in the gate dummy pixel area GD is the same as a distance between the scanning lines 12 in the display area DA.

In each of the dummy pixels of the dummy pixel area DP, a plurality of TFTs, here, two TFTs (hereinafter, referred to as "a protective TFT" 30 serving as an electrostatic protection element are formed along the scanning line 12. The protective TFTs 30 have the actually same size as that of the TFT formed in the display area DA in order to be simultaneously formed with the TFTs formed in the display area DA, but the channel width and the channel length thereof are smaller than those of the TFTs formed in the display area DA. Accordingly, since the protective TFTs 30 are electrically weaker than the TFTs formed in the display area DA, the protective TFTs are subjected to electrostatic breakdown earlier than the TFTs formed in the display area DA.

In the dummy pixels, the gate electrodes G are formed in the same scanning line 12, the source electrodes S are electrically connected to the same signal line 16, and the drain electrodes D are electrically connected to the auxiliary capacitor lines 13 formed in the same dummy pixel, as apparent from the description made with reference to FIGS. 2, 5, and 6. That is, the plurality of protective TFTs 30 is connected in parallel in each of the dummy pixels.

In the dummy pixels having such a configuration, for example, when static electricity enters from the first terminal section Dr or the second terminal section Tp along the signal line 16 through the signal line drawn wiring SL (see FIG. 1), the protective TFT 30 connected to the signal line 16 close to the first terminal section Dr or the second terminal section Tp is first subjected to electrostatic breakdown. The static electricity discharges from the drain electrode D to the auxiliary capacitor line 13 through the contact hole 19'.

Likewise, when static electricity enters from the first terminal section Dr or the second terminal section Tp along the scanning line 12 through the scanning line drawn wiring GL, the protective TFT 30 connected to the scanning line 12 close to the first terminal section Dr or the second terminal section Tp is also first subjected to the electrostatic breakdown. The static electricity discharges from the drain electrode D to the auxiliary capacitor line 13 through the contact hole 19'.

According to the liquid crystal display device 10 according to the invention, even when static electricity enters from the signal line 16 or the scanning line 12, the protective TFT closest to the line through which the static electricity enters is subjected to the electrostatic breakdown. Accordingly, the other protective TFTs 30 and the TFTs located in the display area DA are protected. This protection continues until the protective TFT 30, which is located closest to the display DA, is subjected to the electrostatic breakdown. Accordingly, by increasing the number of protective TFTs 30 connected to each one scanning line or each one signal line, it is possible to further resist the entry of the static electricity.

In the liquid crystal display device 10 according to this embodiment, only two protective TFTs 30 are formed within an area corresponding to one dummy pixel in the gate dummy pixel area GD. However, in this configuration, the TFT in the display area DA may be subjected to the electrostatic breakdown, when static electricity enters along the scanning line 12 at third time. In order to solve this problem, more protective TFTs 30 are connected to each one scanning line by connecting a plurality of protective TFTs to each other in parallel in the gate dummy pixel area GD.

In this embodiment, one of the scanning line 12 and the signal line 16 corresponds to a first wiring, the other of the scanning line 12 and the signal line 16 corresponds to a second wiring, the auxiliary capacitor line 13 corresponds to a third wiring. One of the gate dummy pixel area GD and the source dummy pixel area SD corresponds to a first dummy pixel area and the other of the gate dummy pixel area GD and the source dummy pixel area SD corresponds to a second dummy pixel area.

Modified Example 1

In the liquid crystal display device 10 according to the above-described embodiment, two protective TFTs 30 per one dummy pixel are formed. The number of protective TFTs 30 permitted to be formed per one dummy pixel depends on the width of a portion which is parallel to the scanning line 12 per one dummy pixel. In the latest liquid crystal display device, the size of a pixel is decreased, as high precision is achieved. Moreover, since one dot (one pixel) of the display area is formed in a square shape, one sub-pixel is formed in a rectangular shape. Therefore, the width of the portion which is parallel to the scanning line 12 per one dummy pixel becomes very narrow.

In the configuration of the liquid crystal display device 10 according to the above-described embodiment, it is necessary to increase the width of the gate dummy pixel area GD in order to increase the number of protective TFTs in the gate dummy pixel area GD. A distance between the scanning lines 12 can be narrowed in the source dummy pixel area SD, as shown in FIG. 2. Therefore, even though the width of the source dummy pixel area SD is not broadened, the plurality of protective TFTs 30 can be formed.

With a dummy pixel according to Modified Example 1, as shown in FIG. 7, a diverged scanning line 12' diverged in a branch shape from the scanning line 12 is formed in one dummy pixel to more protective TFTs per one dummy pixel. In the example shown in FIG. 7, eight protective TFTs are formed. With such a configuration, the plurality of protective TFTs 30 can be formed, even though the area of the gate dummy pixel area GD is not particularly broadened.

In order not to increase the number of manufacturing processes, drain electrodes D of the protective TFTs 30 are electrically connected to the auxiliary capacitor lines 13 using the appropriate gate wirings and source wirings in the dummy pixels according to Modified Example 1, since the auxiliary capacitor lines 13 cannot be arranged in a solid shape within the dummy pixels. Alternatively, like the pixel electrodes 20 in the display area, the inter-layer film 18 and the dummy pixel electrodes may be formed in the dummy pixel area, the dummy pixel electrodes may be connected to the common line COM in an area other than the display area, and the dummy pixel electrodes may be electrically connected to the drain electrodes D of the protective TFTs 30 through the contact holes formed in the inter-layer film 18 and the passivation film 17.

The dummy pixel according to Modified Example 1 can be used not only in the gate dummy pixel area GD but also in the source dummy pixel area SD and the common dummy pixel area CD. In the dummy pixel in this modified example, it is desirable that the width of the diverged scanning line 12' diverged from the scanning line 12 is as thick as possible to permit all the protective TFTs 30 to effectively operate by lowering impedance.

Modified Example 2

Figure 8:
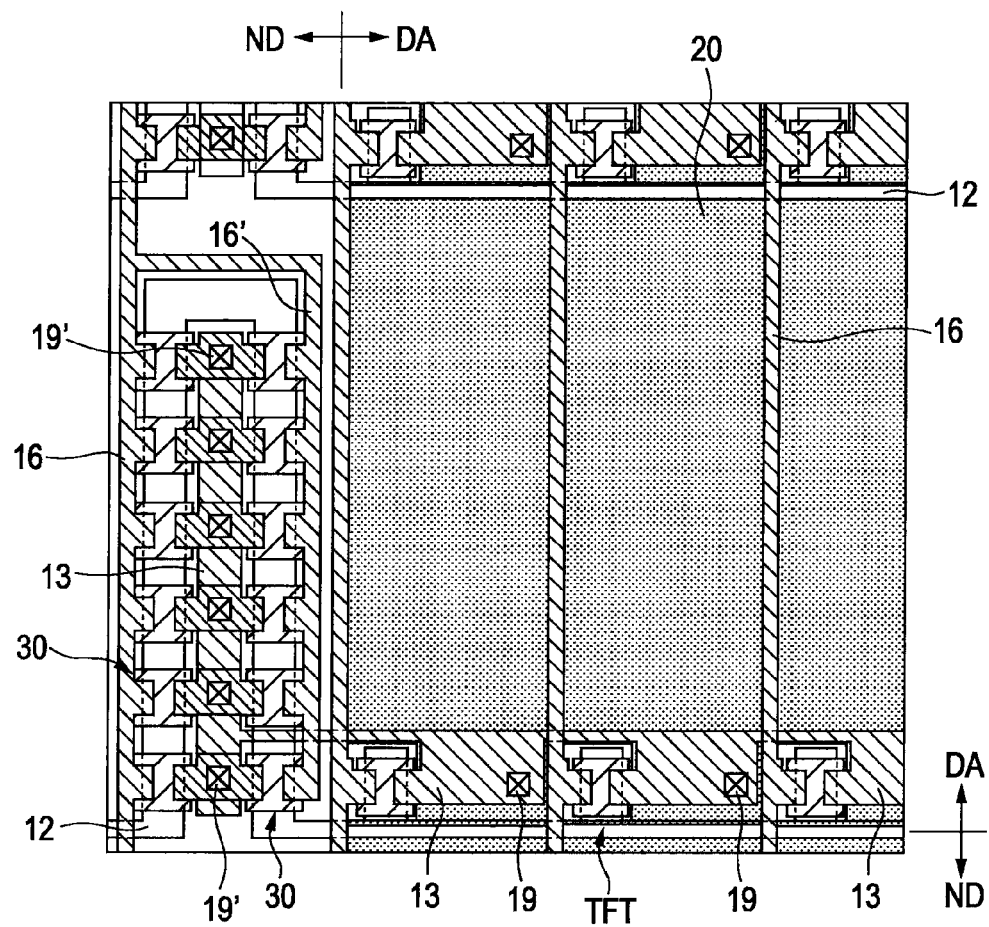
FIG. 8 is an enlarged plan view illustrating a portion corresponding to the region II of FIG. 1 according to Modified Example 2.

In Modified Example 1 described above, the diverged scanning line 12' is formed to arrange more protective TFTs per one dummy pixel without increasing the area of the gate dummy pixel area GD. However, even in Modified Example 1, the number of protective TFTs permitted to be arranged per one dummy pixel is also limited. Accordingly, in Modified Example 2, the scanning line 12 is bent in a narrow long convex shape to be arranged along the adjacent signal line 16 within an area of one dummy pixel, as shown in FIG. 8. A diverged signal line 16' extends from the signal line 16 along the circumference of the bent scanning line 12 so as to occupy a space with the adjacent signal line 16. A plurality of semiconductor layers 15, here, twelve semiconductor layers 15, are formed on the bent scanning line 12 with the gate insulating films 14 interposed therebetween. The source electrodes S are formed in the signal line 16 and the diverged signal line 16' and the drain electrodes D are formed in the middle so as to partially overlap with the semiconductor layers 15. The auxiliary capacitor line 13 within the area of one dummy pixel is formed in a solid shape in the middle and the drain electrode D is electrically connected to the auxiliary capacitor line 13 through the first contact hole 19' formed in the gate insulating film 14. The auxiliary capacitor line 13 in the area of one dummy pixel of the non-display area ND is electrically connected to the auxiliary capacitor line 13 of the display area DA by detouring round the surface of the scanning line 12 via an insulating film separate from the bent scanning line 12 so as to be formed in a convex shape.

Figure 9:
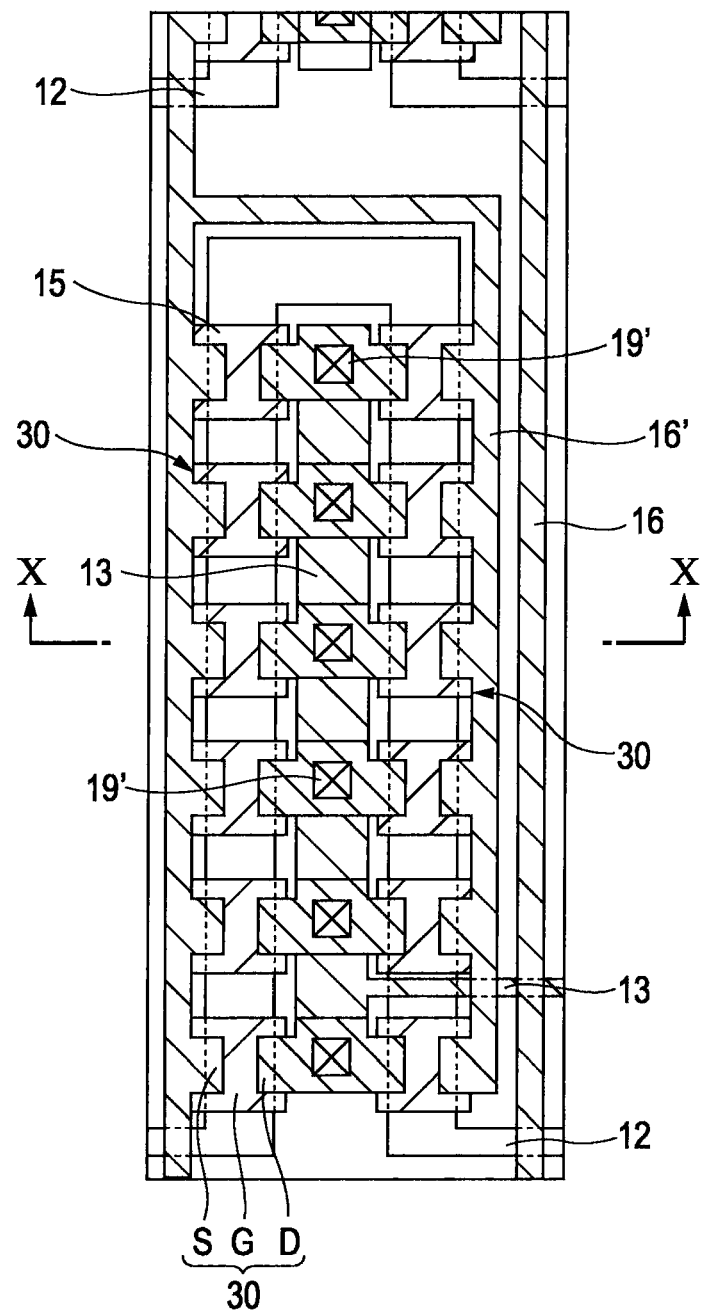
FIG. 9 is an enlarged plan view illustrating one dummy pixel of the gate dummy pixel area according to Modified Example 2.

That is, in the liquid crystal display device 10 according to Modified Example 2, a plurality of TFTs (hereinafter, referred to as "a protective TFT") 30, here 6×2=12 TFTs, as an electrostatic protection element is formed in one dummy pixel, as shown in FIG. 9. In order to simultaneously form the protective TFTs 30 along with the TFTs formed in the display area DA with ease, the size of the protective TFTs is actually the same as that of the TFTs formed in the display area DA. However, the channel width and the channel length of the protective TFTs are smaller than those of the TFTs formed in the display area DA. Accordingly, since the protective TFTs 30 are more vulnerable to static electricity than the TFTs formed in the display area DA, the protective TFTs 30 are subjected to the electrostatic breakdown more than the TFTs formed in the display area DA.

Figure 10:
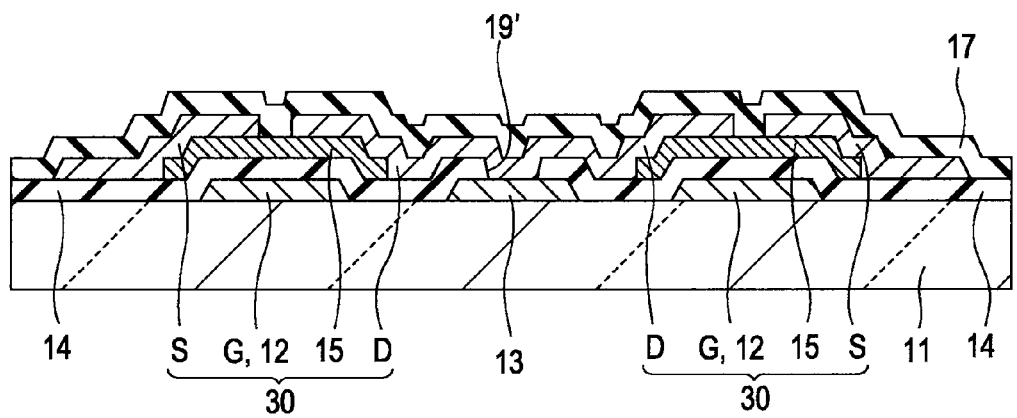
FIG. 10 is a sectional view taken along the line X-X of FIG. 9.

FIG. 10 is a sectional view taken along the line X-X of FIG. 9. As apparent from the description with reference to FIGS. 8, 9, and 10, in an area of one dummy pixel, gate electrodes G of the protective TFTs 30 are formed in the same scanning line 12, source electrodes S thereof are electrically connected to the same signal line 16 or the diverged signal line 16', and drain electrodes D thereof are electrically connected to the auxiliary capacitor line 13 formed within an area of one dummy pixel in the same non-display area ND. That is, the plurality of protective TFTs 30 is connected to each other in parallel in the area of one dummy pixel.

Modified Example 3

In the liquid crystal display device 10 according to Modified Example 2, the scanning line 12 is bent to lengthen the scanning line 12 in the area of one dummy pixel. However, the signal line 16 may be bent to lengthen the signal line 16. An example where the signal line 16 in the area of one dummy pixel is bent according to Modified Example 3 will be described with reference to FIG. 11.

Figure 11:
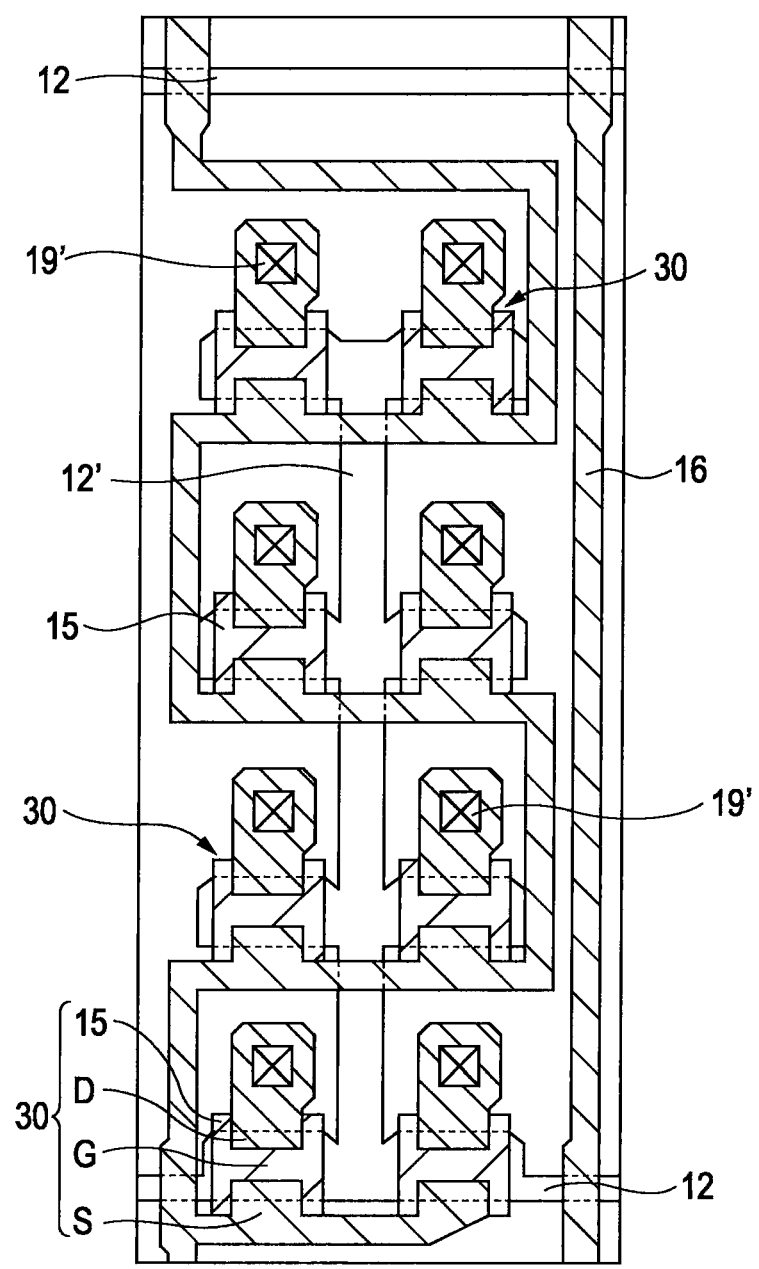
FIG. 11 is an enlarged plan view illustrating one dummy pixel of a gate dummy pixel area according to Modified Example 3.
Figure 12:
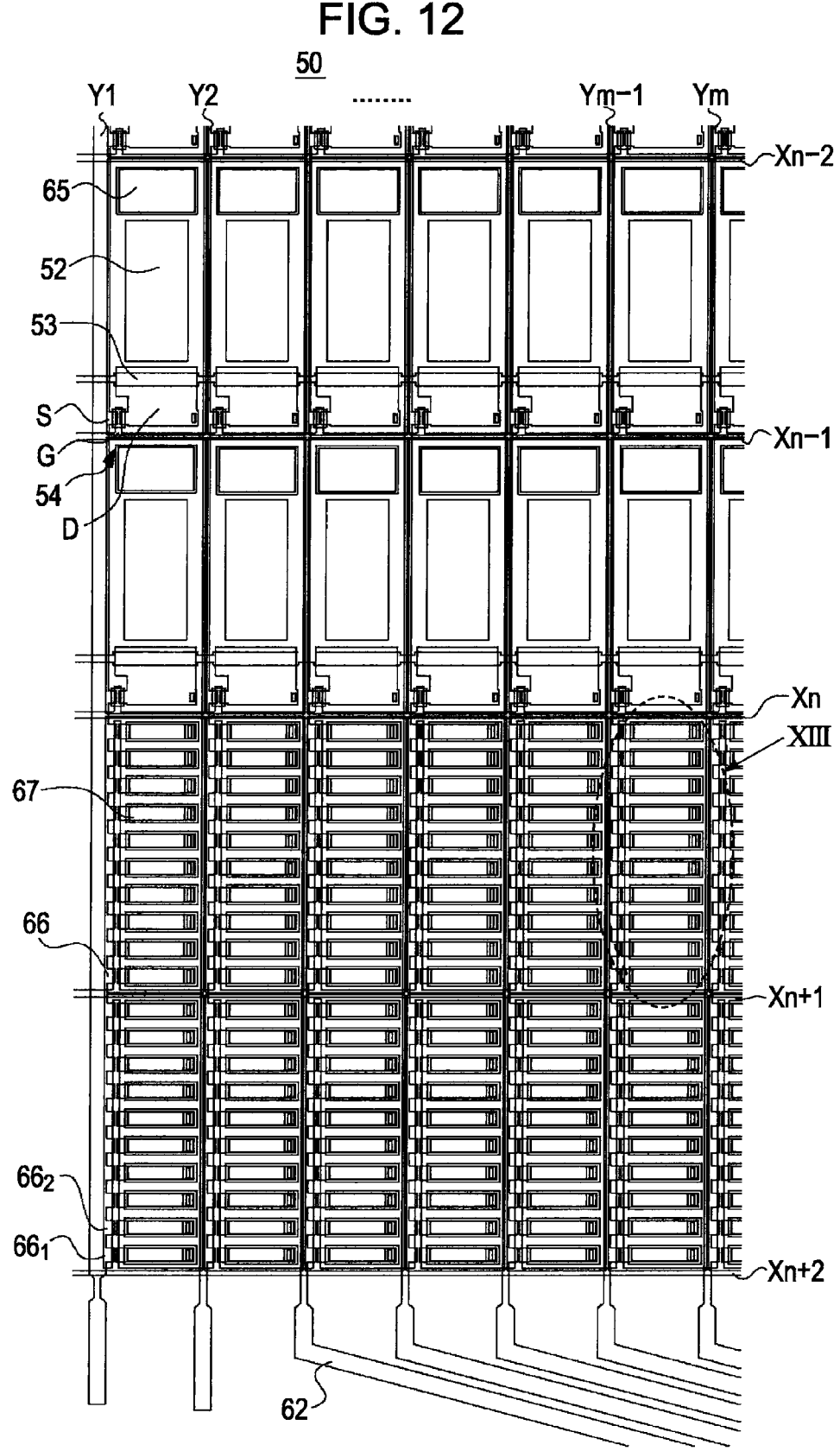
FIG. 12 is an enlarged plan view illustrating a dummy pixel area of an array substrate of a known liquid crystal display device.
Figure 13:
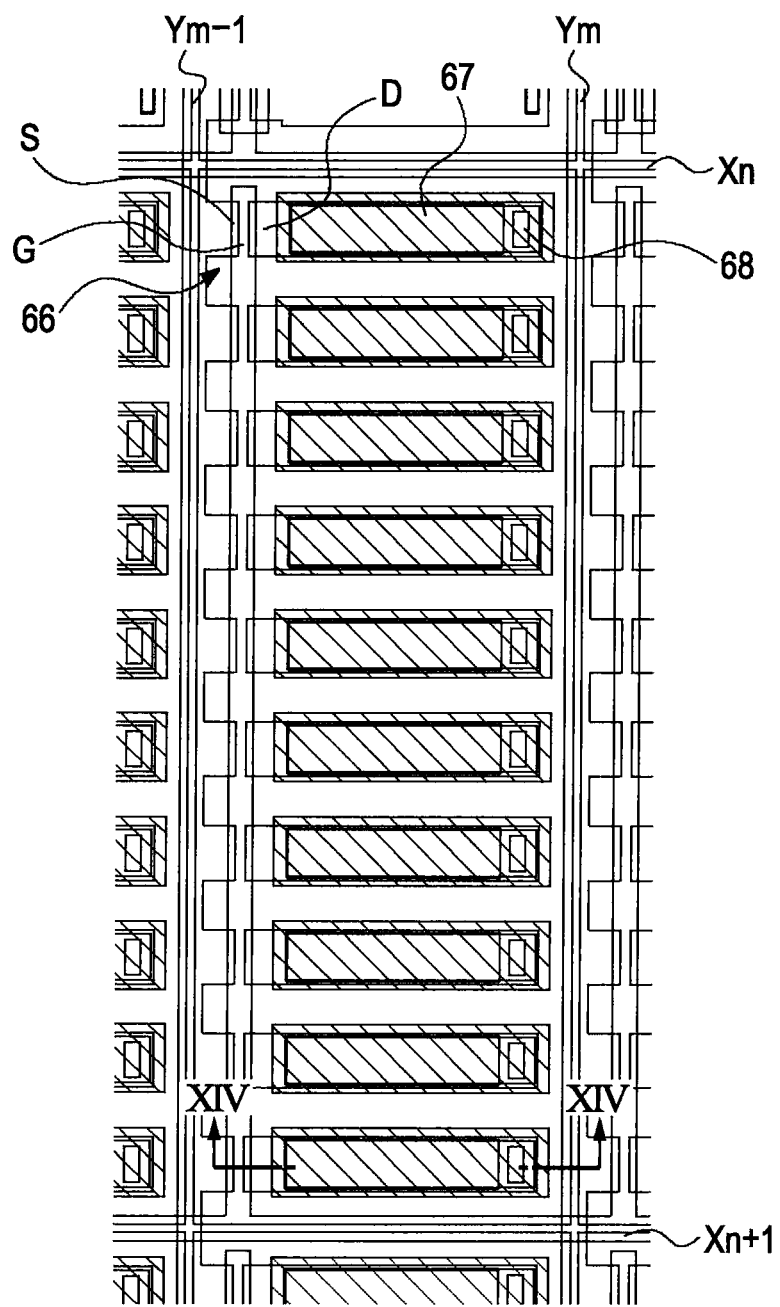
FIG. 13 is an enlarged plan view illustrating the region XIII of FIG. 12.

In the area of one dummy pixel shown in FIG. 11 according to Modified Example 3, the signal line 16 is bent in a "U" shape in a zigzag manner. A diverged scanning line 12' diverged in a branch shape from the scanning line 12 is disposed so as to cross the signal line 16 bent in the "U" shape in a zigzag manner. A plurality of protective TFTs 30, here, eight protective TFTs, in which the diverged scanning line 12' serves as a gate electrode G is formed on the diverged scanning line 12'. Even though the auxiliary capacitor line within the area of one dummy pixel is not shown, the auxiliary capacitor line 13 is disposed below each drain electrode D and a portion passing over the diverged scanning line 12= is electrically connected to the auxiliary capacitor line 13 in the display area DA with a separate insulating film interposed therebetween. In the area of one dummy pixel according to Modified Example 3, it is desirable that the width of the diverged scanning line 12' diverged from the scanning line 12 is as thick as possible to permit all the protective TFTs 30 to effectively operate by lowering impedance.

In order not to increase the number of manufacturing processes, drain electrodes D of the protective TFTs 30 are electrically connected to the auxiliary capacitor lines 13 using the appropriate gate wirings and source wirings in the area of one dummy pixel according to Modified Example 3, as described above, since the auxiliary capacitor lines 13 cannot be arranged in a solid shape. Like the pixel electrodes 20 in the display area DA, an inter-layer 18 and dummy pixel electrodes may be formed in the area of one dummy pixel, the dummy pixel electrodes may be connected to the common line COM in an area other than the display area, and the dummy pixel electrodes may be electrically connected to the drain electrodes D of the protective TFTs 30 through the contact holes formed in the inter-layer film 18 and the passivation film 17. With such a configuration, particularly, the auxiliary capacitor line 13 may not be formed in the area of one dummy pixel in the non-display area ND.

In Modified Examples 2 and 3 described above, since the shape of each pixel in the display area DA is vertically long, the case where the shape of the area of one dummy pixel is vertically long has been described. However, when the scanning line is bent in the area of one dummy pixel in the non-display area ND in a case where each pixel in the display area DA has a horizontally long rectangular shape, the scanning line may be bent in a "U" shape in a zigzag manner. When the signal line is bent, the scanning line may be bent in a convex shape or a concave shape. In Modified Examples 2 and 3 described above, the case where the configuration of the electrostatic protection mechanism in all of the area of one pixel is realized in the same manner has been described. However, different configurations may be realized in the non-display areas ND located in the right and left sides of the display area DA and in the non-display areas ND located in the upper and lower sides of the display area DA.

In Modified Examples 1 to 3 described above, a transmissive liquid crystal display device of a vertical electric field type of a TN mode has been described as an example. However, the invention is not limited thereto, but may be applied in the same manner to a liquid crystal display device of a vertical electric field type of another mode, a liquid crystal display device of a horizontal electric field type of another mode, or a liquid crystal display device including a reflecting unit. In particular, in an FFS mode liquid crystal display device having upper electrodes with slits and a lower electrode over an inter-layer film, the upper electrodes or lower electrodes are supplied with a common potential. Therefore, even with the configuration of the above-described modified examples, the drain electrode D of the protective TFT 30 can be easily connected to a wiring of a common potential without particularly increasing the number of manufacturing process.

What is claimed is:
1. A liquid crystal display device comprising:
a first substrate;
a second substrate which faces the first substrate;
a liquid crystal which is interposed between the first and second substrates,
a plurality of scanning lines and signal lines arranged in a matrix shape;
a plurality of switching elements arranged in the vicinities of intersections of the scanning lines and the signal lines in a display area;

a plurality of pixel electrodes electrically connected to the switching elements;

a first plurality of dummy pixels formed in a first non-display area located in the periphery of the display area are formed on the first substrate on at least one of the left side and the right side of a liquid crystal layer in plan view; and a second plurality of dummy pixels formed in a second non-display area located in the periphery of the display area are foamed on the first substrate on at least one of the top side and the bottom side of a liquid crystal layer in plan view, wherein each of the first plurality of dummy pixels is provided with a first plurality of switching elements connected to one of the scanning lines, the first plurality of switching elements are connected to each other in parallel, and one electrode of each of the first plurality of switching elements is connected to a first wiring of a common potential, and wherein each of the second plurality of dummy pixels is provided with a second plurality of switching elements connected to one of the signal lines, the plurality of switching elements are connected to each other in parallel, and one electrode of each of the second plurality of switching elements is connected to a second wiring of the common potential, and wherein each of the first plurality of dummy pixels are larger is size than each of the second plurality of dummy pixels.

2. The liquid crystal display device according to claim 1, wherein at least one of the scanning lines and the signal lines include a bent portion which is made in at least one of a U shape and a zigzag shape.

3. The liquid crystal display device according to claim 1, wherein each of the first plurality of dummy pixels is the same size and shape as the second plurality of dummy pixels.

4. The liquid crystal display device according to claim 1, wherein each of the first plurality of dummy pixels is the same size and shape as pixels in the display area.

* * * * *